United States Patent
Xu et al.

(10) Patent No.: US 11,782,981 B2
(45) Date of Patent: Oct. 10, 2023

(54) METHOD, APPARATUS, SERVER, AND STORAGE MEDIUM FOR INCORPORATING STRUCTURED ENTITY

(71) Applicant: BEIJING BAIDU NETCOM SCIENCE AND TECHNOLOGY CO., LTD., Beijing (CN)

(72) Inventors: Ye Xu, Beijing (CN); Zhifan Feng, Beijing (CN); Chao Lu, Beijing (CN); Yang Zhang, Beijing (CN); Zhou Fang, Beijing (CN); Shu Wang, Beijing (CN); Yong Zhu, Beijing (CN); Ying Li, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 1210 days.

(21) Appl. No.: 16/213,610

(22) Filed: Dec. 7, 2018

(65) Prior Publication Data
US 2019/0220752 A1    Jul. 18, 2019

(30) Foreign Application Priority Data

Dec. 8, 2017   (CN) .......................... 201711297668.7

(51) Int. Cl.
*G06F 16/901* (2019.01)
*G06F 16/28* (2019.01)
(Continued)

(52) U.S. Cl.
CPC ........ *G06F 16/9024* (2019.01); *G06F 16/288* (2019.01); *G06F 16/951* (2019.01); *G06F 16/955* (2019.01)

(58) Field of Classification Search
CPC .. G06F 16/288; G06F 16/9024; G06F 16/951; G06F 16/955
See application file for complete search history.

(56) References Cited

U.S. PATENT DOCUMENTS

| 8,386,410 B2 | 2/2013 | Gopisetty et al. |
| 8,873,813 B2 * | 10/2014 | Tadayon .................. G06K 9/62 |
| | | 382/118 |

(Continued)

FOREIGN PATENT DOCUMENTS

| CN | 103955531 A | 7/2014 |
| CN | 105045863 A | 11/2015 |

(Continued)

*Primary Examiner* — Miranda Le
(74) *Attorney, Agent, or Firm* — Knobbe, Martens, Olson & Bear LLP

(57) ABSTRACT

Embodiments of the disclosure disclose a method, apparatus, server, and storage medium for incorporating a structured entity, wherein the method for incorporating a structured entity can comprise: selecting a candidate entity associated with a to-be-incorporated structured entity from a knowledge graph, determining the to-be-incorporated structured entity being an associated entity based on prior attribute information of a category of the candidate entity and a preset model, merging the associated entity and the candidate entity, and incorporating the associated entity into the knowledge graph. The embodiments can select a candidate entity, and then integrate a preset model using prior knowledge, which can effectively improve the efficiency and accuracy in associating entities, and reduce the amount of calculation, to enable the structured entity to be simply and efficiently incorporated into the knowledge graph.

17 Claims, 5 Drawing Sheets

(51) Int. Cl.
*G06F 16/951* (2019.01)
*G06F 16/955* (2019.01)

(56) References Cited

U.S. PATENT DOCUMENTS

| | | | |
|---|---|---|---|
| 9,235,653 B2 | 1/2016 | Talmon et al. | |
| 9,535,902 B1* | 1/2017 | Michalak | G06F 16/3331 |
| 9,984,146 B2* | 5/2018 | Antal | G06F 16/9535 |
| 10,303,999 B2* | 5/2019 | Hertz | G06K 9/6259 |
| 10,628,490 B2* | 4/2020 | Yakout | G06F 16/9024 |
| 2005/0038671 A1* | 2/2005 | Naeymi-Rad | G16H 10/60 |
| | | | 707/999.1 |
| 2006/0136467 A1* | 6/2006 | Avinash | G06F 16/25 |
| | | | 707/999.102 |
| 2008/0010259 A1* | 1/2008 | Feng | G06F 16/9537 |
| 2009/0125529 A1* | 5/2009 | Vydiswaran | G06F 16/951 |
| 2009/0240682 A1* | 9/2009 | Balmin | G06F 16/248 |
| | | | 707/999.005 |
| 2015/0095303 A1* | 4/2015 | Sonmez | G06N 5/003 |
| | | | 707/707 |
| 2017/0140059 A1* | 5/2017 | Li | G06F 16/3346 |
| 2018/0039696 A1* | 2/2018 | Zhai | G06F 16/35 |

FOREIGN PATENT DOCUMENTS

| | | |
|---|---|---|
| CN | 105373590 A | 3/2016 |
| CN | 105786980 A | 7/2016 |
| CN | 106168947 A | 11/2016 |
| CN | 106777274 A | 5/2017 |
| CN | 107066621 A | 8/2017 |

* cited by examiner

METHOD, APPARATUS, SERVER, AND STORAGE MEDIUM FOR INCORPORATING STRUCTURED ENTITY

CROSS-REFERENCE TO RELATED APPLICATIONS

This application claims priority to Chinese Application No. 201711297668.7, filed on Dec. 8, 2017 and entitled "Method, Apparatus, Server, and Storage Medium for Incorporating Structured Entity," the entire disclosure of which is hereby incorporated by reference.

TECHNICAL FIELD

Embodiments of the disclosure relate to the field of data processing technology, and in particular to a method, apparatus, server, and storage medium for incorporating a structured entity.

BACKGROUND

The knowledge graph has a pivotal status in both academia and industrial circles, is the foundation of artificial intelligence, is also the only way to realize the applications such as intelligent question and answer, and can provide information for users quickly and conveniently. The knowledge graph is essentially a network including entity nodes and sides between the nodes. The repetition rate and accuracy of the knowledge graph will affect its service quality.

When there is a need for update, a new entity needs to be incorporated into the knowledge graph. At present, when an entity is to be added each time, it is usually necessary to perform entity resolution on all the entities in the knowledge graph, which is time-consuming with large amount of calculation, and is impossible to be suitable for incorporating tens of billions of entities. Moreover, the existing entity resolution methods calculate the matching score of entities using a cosine similarity, or express the context of an entity in a BOW (Bag-of-Words) vector form and calculate the cosine value between vectors to determine the similarity between the entities. These methods are less accurate.

SUMMARY

Embodiments of the disclosure provide a method, apparatus, server, and storage medium for incorporating a structured entity, to solve the problems of large amount of calculation, time-consuming process, and low accuracy in incorporating an entity into the existing knowledge graph.

In a first aspect, an embodiment of the disclosure provides a method for incorporating a structured entity. The method includes: selecting a candidate entity associated with a to-be-incorporated structured entity from a knowledge graph; determining the to-be-incorporated structured entity being an associated entity based on prior attribute information of a category of the candidate entity and a preset model; and merging the associated entity and the candidate entity, and incorporating the associated entity into the knowledge graph.

In a second aspect, an embodiment of the disclosure provides an apparatus for incorporating a structured entity. The apparatus includes: a candidate entity selection module, for selecting a candidate entity associated with a to-be-incorporated structured entity from a knowledge graph; an associated entity determining module, for determining the to-be-incorporated structured entity being an associated entity based on prior attribute information of a category of the candidate entity and a preset model; and an associated entity incorporation module, for merging the associated entity and the candidate entity, and incorporating the associated entity into the knowledge graph.

In a third aspect, an embodiment of the disclosure further provides a server. The server includes: one or more processors; and a memory, for storing one or more programs, where the one or more programs, when executed by the one or more processors, cause the one or more processors to implement the above method for incorporating a structured entity.

In a fourth aspect, an embodiment of the disclosure provides a computer readable storage medium storing a computer program therein, where the program, when executed by a processor, implements the above method for incorporating a structured entity.

The embodiments of the disclosure select a candidate entity associated with a to-be-incorporated structured entity from a knowledge graph, determine the to-be-incorporated structured entity being an associated entity based on prior attribute information of a category of the candidate entity and a preset model, merge the associated entity and the candidate entity after determining the structured entity being an associated entity, and incorporate the associated entity into the knowledge graph, thereby solving the problems of large amount of calculation, and time-consuming and less accurate entity resolution when incorporating an entity into the existing knowledge graph, because it is necessary to perform entity resolution on the existing entities in the knowledge graph once when an entity is to be added each time. The embodiments select a candidate entity, and then integrate a preset model using prior knowledge, which can effectively improve the efficiency and accuracy in associating entities, and reduce the amount of calculation, to enable the structured entity to be simply and efficiently incorporated into the knowledge graph.

DETAILED DESCRIPTION OF EMBODIMENTS

The disclosure is further described in detail below in conjunction with the accompanying drawings and embodiments. It may be appreciated that the embodiments described here are only used for illustrating the disclosure, rather than limiting the disclosure. Furthermore, it should also be noted that only the parts associated with the disclosure, rather than all structure, are shown in the accompanying drawings to facilitate description.

First embodiment is as follows.

Figure 1:
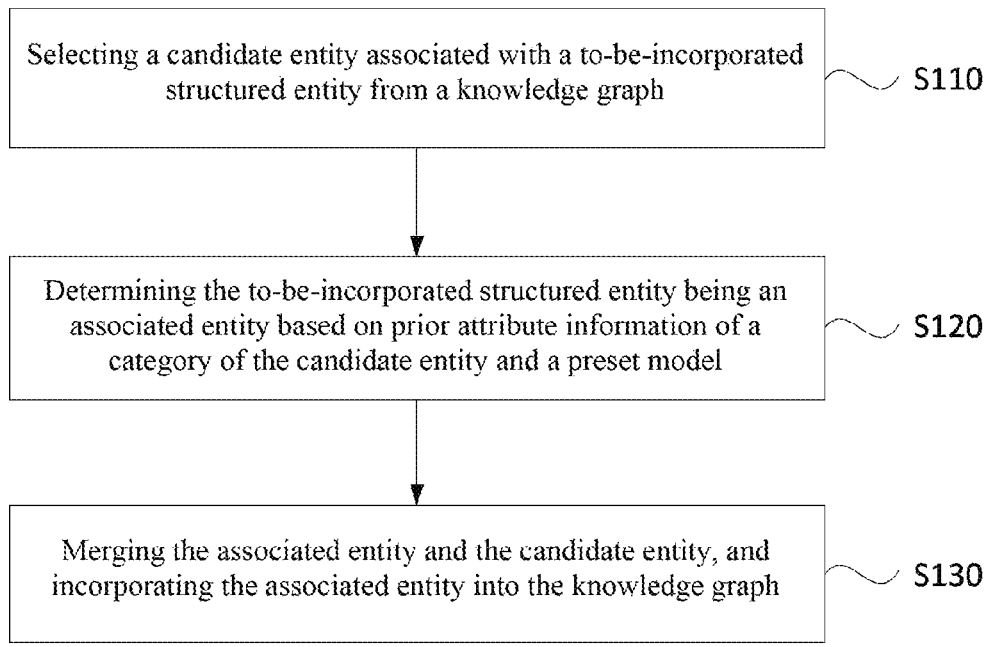
FIG. 1 is a flowchart of a method for incorporating a structured entity according to a first embodiment of the disclosure.

FIG. 1 is a flowchart of a method for incorporating a structured entity according to the first embodiment of the disclosure. The embodiment is applicable to expansion of a knowledge graph. The method may be executed by an apparatus for incorporating a structured entity. The apparatus may be implemented by software and/or hardware, and may be integrated into a server. As shown in FIG. 1, the method specifically includes the following steps.

S110: selecting a candidate entity associated with a to-be-incorporated structured entity from a knowledge graph.

When incorporating a structured entity into the existing knowledge graph, entity resolution needs to be performed on all entities in the knowledge graph for each to-be-incorporated structured entity. Because of involving entity resolution on all entities, the existing method for incorporating a structured entity into the knowledge graph is time-consuming with large amount of calculation. The method for incorporating a structured entity into the knowledge graph in the embodiment no longer performs entity resolution on all entities included in the knowledge graph when incorporating a structured entity, but selects associated candidate entity from the knowledge graph, thereby reducing the number of compared entities, and then reducing the time complexity.

In the embodiment, the to-be-incorporated structured entity is an entity not incorporated in the existing knowledge graph, and may be obtained by, e.g., web crawling. The candidate entity may be selected from the knowledge graph using the characteristic of the to-be-incorporated structured entity as a selection criterion. After acquiring the candidate entity, the to-be-incorporated structured entity may be associated with the knowledge graph using the candidate entity, where the characteristic as the selection criterion may be an entity name. Each to-be-incorporated structured entity may correspond to one or more candidate entities. Of course, candidate entity associated with the to-be-incorporated structured entity may not exist in the knowledge graph, and the to-be-incorporated structured entity cannot be associated with the knowledge graph. In this case, the to-be-incorporated structured entity may be considered to be directly added into the knowledge graph, which will be described in embodiments hereinafter.

S120: determining the to-be-incorporated structured entity being an associated entity based on prior attribute information of a category of the candidate entity and a preset model.

In the embodiment, the prior attribute information refers to some information preconfigured by a user based on an entity category (such as a movie, or a character) and the prior knowledge of an attribute in the category, and may be, e.g., an attribute comparison method, an importance degree of an attribute for determining whether an entity pair is identical, and a user's annotation on whether the entity pair is identical based on the attribute. A similarity between the to-be-incorporated structured entity and the candidate entity thereof may be determined based on prior attribute information of a category of the candidate entity and a preset model, and then whether the to-be-incorporated structured entity can be associated with the knowledge graph may be determined. The existence of the candidate entity having high similar degree means that the to-be-incorporated structured entity can be associated with the knowledge graph, and the to-be-incorporated structured entity is an associated entity. Integrating the preset modeled using the prior knowledge can effectively improve the efficiency and accuracy in associating entities.

S130: merging the associated entity and the candidate entity, and incorporating the associated entity into the knowledge graph.

In the embodiment, after determining the to-be-incorporated structured entity being the associated entity, the associated entity may be incorporated into the knowledge graph by merging the associated entity and the candidate entity using the association relationship between the associated entity and candidate entity that can be associated with the associated entity.

The method for incorporating a structured entity according to the embodiment selects a candidate entity associated with a to-be-incorporated structured entity from a knowledge graph, determines the to-be-incorporated structured entity being an associated entity based on prior attribute information of a category of the candidate entity and a preset model, merges the associated entity and the candidate entity after determining the structured entity being an associated entity, and incorporates the associated entity into the knowledge graph, thereby solving the problems of large amount of calculation, and time-consuming and less accurate entity resolution when incorporating an entity into the existing knowledge graph, because it is necessary to perform entity resolution on all the existing entities in the knowledge graph once when an entity is to be added each time. The method in the embodiment selects a candidate entity, and then integrates a preset model using the prior knowledge, which can effectively improve the efficiency and accuracy in associating entities, and reduce the calculation workload, to enable a structured entity to be simply and efficiently incorporated into the knowledge graph.

Based on the above embodiments, furthermore, the selecting a candidate entity associated with a to-be-incorporated structured entity from a knowledge graph may include the following steps.

The candidate entity associated with a name of the to-be-incorporated structured entity is selected from the knowledge graph using at least one of fuzzy query or accurate query based on a pre-established index. The index is established based on identifiers, names and aliases of all structured entities in the knowledge graph. The fuzzy query is used for selecting a first preset number of candidate entities having names similar to the name of the to-be-incorporated structured entity based on the index. The accurate query is used for selecting a second preset number of candidate entities having names identical to the name of the to-be-incorporated structured entity based on the index.

In the embodiment, the related candidate entity may be selected from the knowledge graph using a name of the to-be-incorporated structured entity. The candidate entity may be selected from a category of the to-be-incorporated entity. For example, the to-be-incorporated structured entity belongs to a movie category, and then the candidate entity is selected from the movie category of the knowledge graph.

In the embodiment, an index relationship may be pre-established based on structured entities in the knowledge graph, to quickly select the candidate entity. Specifically, an index may be established based on identifiers, names and aliases of all structured entities in the knowledge graph. The index may regard a structured entity and an entity having an alias corresponding to the structured entity as identical candidate entities having a common attribute. The selecting the candidate entity associated with a name of the to-be-incorporated structured entity using fuzzy query based on the pre-established index includes: calculating similarities between the name of the to-be-incorporated structured entity and names and/or aliases in the index, and selecting a first preset number of candidate entities with high similarities. The first preset number is set based on the actual demand. For example, the similarities between the name of the to-be-incorporated structured entity and the names and/or aliases in the index may be determined by calculating text similarities, and the similarities may be sorted to select entities with top 10 highest similarities as a fuzzy query result. The selecting the candidate entity associated with a name of the to-be-incorporated structured entity using accurate query based on the pre-established index includes: finding names and/or aliases of entities identical to the name of the to-be-incorporated structured entity in the index, and selecting a second preset number of candidate entities. The second preset number is set based on the actual demand, and is, e.g., 100. If the number of names of the found entities identical to the name of the to-be-incorporated structured entity is more than the second preset number, then the second preset number of entities may be randomly selected therefrom for use as an accurate query result.

In specific implementation, the candidate entity may be selected using fuzzy query; the candidate entity may be selected using accurate query; or the candidate entity may also be selected using both fuzzy query and accurate query. This solution can guarantee a high recall rate.

Furthermore, the selecting the candidate entity associated with a to-be-incorporated structured entity from a knowledge graph may further include: determining the to-be-incorporated structured entity being a non-associated entity, if no candidate entity associated with the to-be-incorporated structured entity is selected from the knowledge graph. It is impossible to link a non-associated entity to the knowledge graph by association of entities. The method for incorporating the non-associated entity will be described in embodiments hereinafter.

On the basis of the above embodiments, furthermore, before the selecting a candidate entity associated with a to-be-incorporated structured entity from a knowledge graph, the method may include: pre-establishing a unified grammatical system, to enable the to-be-incorporated structured entity and the attribute thereof, and the structured entities in the knowledge graph and attributes thereof to be subject to the unified grammatical system. The structured entities are standardized using the unified grammatical system, which helps to accurately and effectively determine a relationship between attributes of entities.

Second embodiment is as follows.

Figure 2:
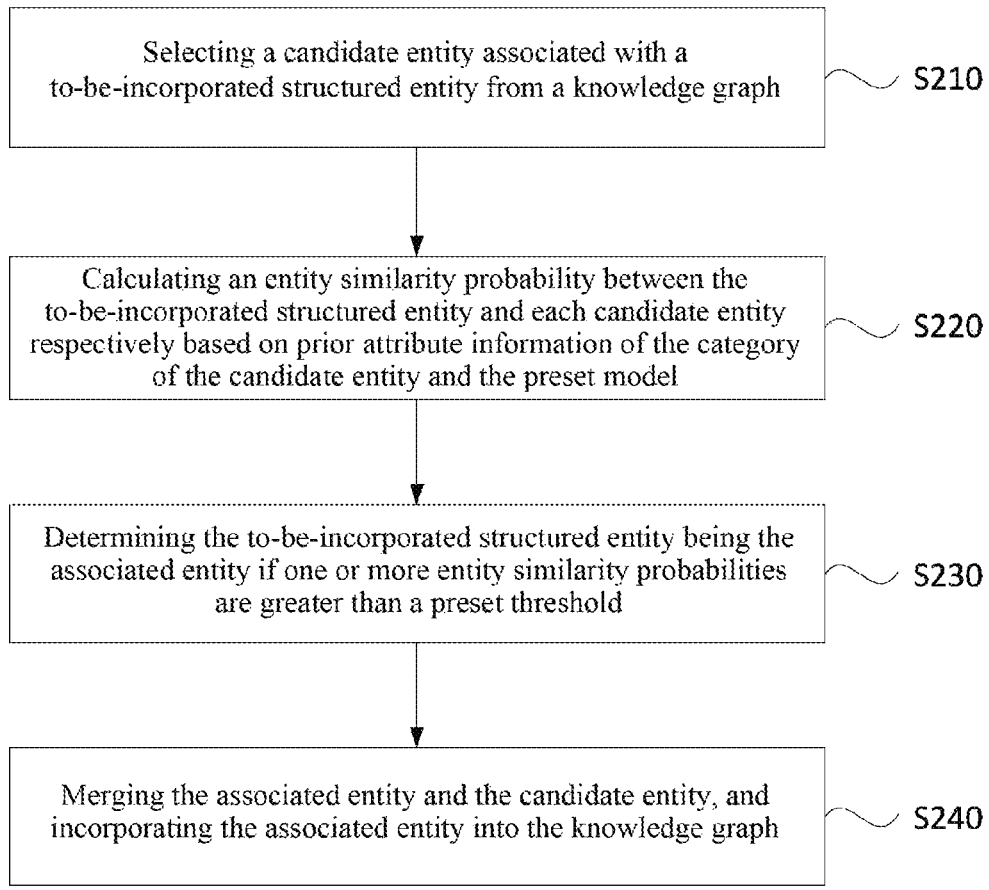
FIG. 2 is a flowchart of a method for incorporating a structured entity according to a second embodiment of the disclosure.

The embodiment provides an operational embodiment of S120 on the basis of the above embodiments. FIG. 2 is a flowchart of a method for incorporating a structured entity according to the second embodiment of the disclosure. As shown in FIG. 2, the method includes the following steps.

S210: selecting a candidate entity associated with a to-be-incorporated structured entity from a knowledge graph.

S220: calculating an entity similarity probability between the to-be-incorporated structured entity and each candidate entity respectively based on prior attribute information of the category of the candidate entity and the preset model.

Each to-be-incorporated structured entity and each candidate entity have attribute information. In the embodiment, the entity similarity probability between the to-be-incorporated structured entity and each candidate entity may be calculated respectively using the attribute information of the entities based on the prior attribute information. The entity similarity probability is a similarity degree between the to-be-incorporated structured entity and the candidate entity, and is used for determine whether the to-be-incorporated structured entity can be associated with the knowledge graph.

S230: determining the to-be-incorporated structured entity being the associated entity if one or more entity similarity probabilities are greater than a preset threshold.

In the embodiment, a preset threshold of the entity similarity probability may be determined based on prior knowledge. When one or more entity similarity probabilities among the calculated entity similarity probabilities are greater than the preset threshold, then it is determined that there is a high similarity between the to-be-incorporated structured entity and a corresponding candidate entity, and the to-be-incorporated structured entity can be associated with the knowledge graph.

Furthermore, among the calculated entity similarity probabilities, there is also a situation where all the entity similarity probabilities are less than the preset threshold. In this case, it may be determined that there are low similarities between the to-be-incorporated structured entity and all candidate entities, and the to-be-incorporated structured entity can not be associated with the knowledge graph through the candidate entities.

S240: merging the associated entity and the candidate entity, and incorporating the associated entity into the knowledge graph. The candidate entity with the highest similarity may be selected from all candidate entities associated with the associated entity, and be merged.

The method for incorporating a structured entity according to the embodiment selects a candidate entity associated with a to-be-incorporated structured entity from a knowledge graph, calculates an entity similarity probability between the to-be-incorporated structured entity and each candidate entity based on prior attribute information, determines whether the to-be-incorporated structured entity is an associated entity using the entity similarity probability, determines the to-be-incorporated structured entity being an associated entity if one or more entity similarity probabilities are greater than a preset threshold, merges the associated entity and the candidate entity after determining the structured entity being an associated entity, and incorporates the associated entity into the knowledge graph, thereby solving the problems of large amount of calculation, and time-consuming and less accurate entity resolution when incorporating an entity into the existing knowledge graph, because it is necessary to perform entity resolution on all the existing entities in the knowledge graph once when an entity is to be added each time, integrating prior knowledge of human therein, and enabling the knowledge graph to simply and efficiently incorporate a structured entity while improving the accuracy of the knowledge graph.

Third embodiment is as follows.

Figure 3:
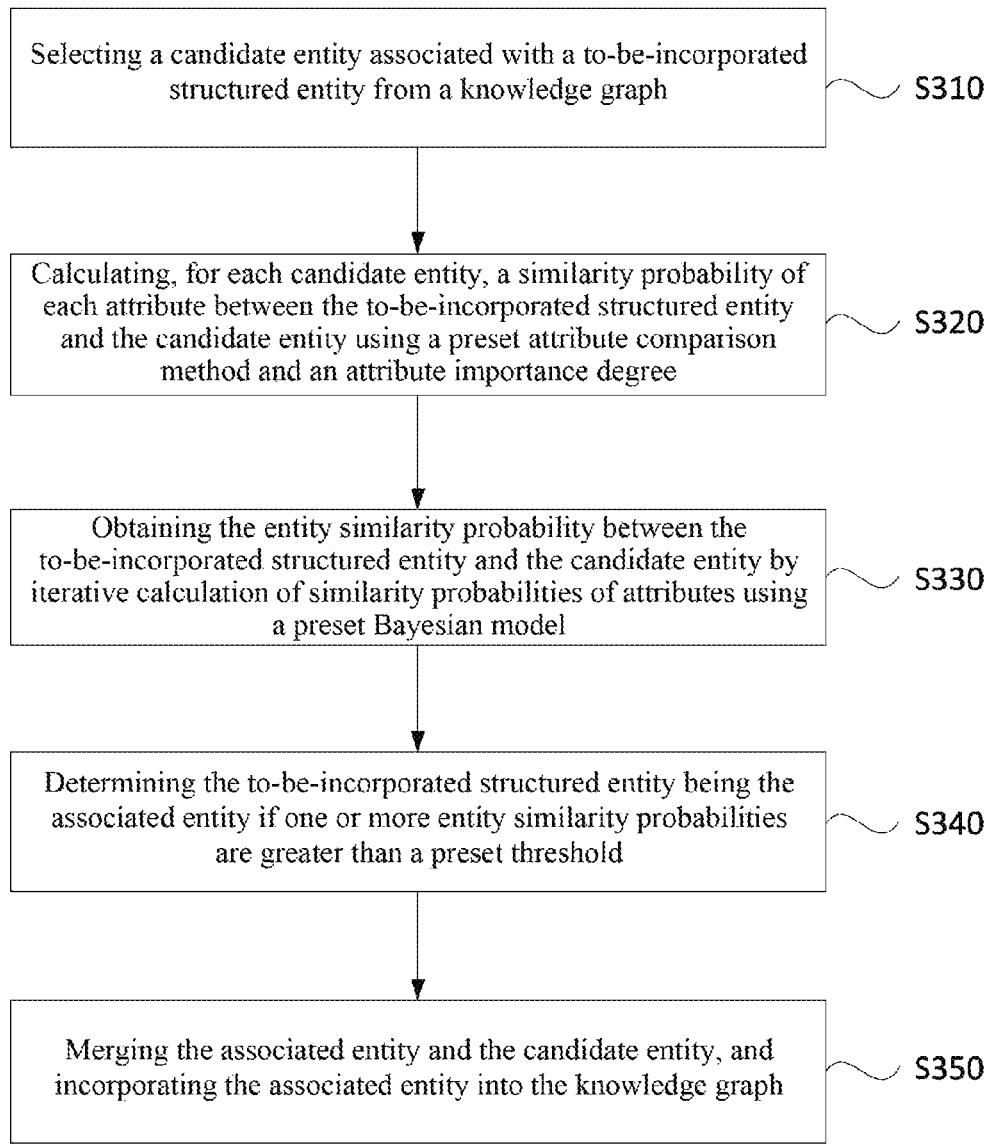
FIG. 3 is a flowchart of a method for incorporating a structured entity according to a third embodiment of the disclosure.

The embodiment provides an operational embodiment of S220 on the basis of the above embodiments. FIG. 3 is a flowchart of a method for incorporating a structured entity according to the third embodiment of the disclosure. As shown in FIG. 3, the method includes the following steps.

S310: selecting a candidate entity associated with a to-be-incorporated structured entity from a knowledge graph.

S320: calculating, for each candidate entity, a similarity probability of each attribute between the to-be-incorporated structured entity and the candidate entity using a preset attribute comparison method and an attribute importance degree.

In the embodiment, one or more candidate entities may correspond to the to-be-incorporated structured entity, and the to-be-incorporated structured entity and each candidate entity each include one or more attributes. For the each candidate entity, a similarity probability of each attribute between the to-be-incorporated structured entity and the candidate entity may be calculated using the preset attribute comparison method and the attribute importance degree.

The attribute comparison method refers to a method of comparing a similarity between an attribute which is set based on an attribute characteristic, and may include: accurate comparison, floating point comparison, location comparison, date comparison, or character string fuzzy comparison. Specifically, a corresponding comparison method may be selected from preset attribute comparison methods based on different attributes. For example, when the attribute is a character string, the attribute may be accurately compared using an exact comparer, 1 is returned if the attributes are identical, and otherwise 0 is returned. When the attribute is a date, then a time comparer may be used, 1 is returned if the dates are identical, and otherwise 0 is returned. When the attribute is a phone number, a tele comparer may be used to compare whether the last six numbers of the phone numbers are identical, 1 is returned if the last six numbers of the phone numbers are identical, and otherwise 0 is returned, and so on. Furthermore, there are other comparers as follows: an edit comparer is used for returning a Levinstein distance of two character strings, and the returned result is a continuous value between 0 and 1. A year comparer is used for comparing years, 1 is returned if the absolute value of difference between two values is less than a customized threshold, and otherwise 0 is returned. A plsa comparer is used for calculating the plsa similarity between two values, and a plsa model is trained by Baidu Encyclopedia. A coccur comparer is used for determining whether a first character string appears in a second character string, 1 is returned if the first character string appears in the second character string, and otherwise 0 is returned. A phonenumber comparer is used for comparing whether two strings of numerals are identical, 1 is returned if the two strings of numerals are identical, and otherwise 0 is returned. A float comparer is used for comparing two floating point numbers, 1 is returned if the absolute value of difference between two values is less than a customized threshold, and otherwise 0 is returned.

Furthermore, some attributes are single values, and some attributes are multiple values. For example, the attribute of a birth date is a single value, and the attribute of an actor is a multiple value for a movie work. Therefore, the attribute comparison method further includes single value comparison and multiple value comparison. The multiple value comparison needs to be based on a single value comparison result after setting a relationship between each single value comparison result and the final multiple value result, i.e., the multiple value comparison needs pairwise comparison of multiple values of an attribute corresponding to different entities, and then obtains the final comparison result based on the pairwise comparison result. For example, an actor A (entity) has m masterpieces (an attribute of the masterpiece has m values), an actor B has n masterpieces, m<n, and pairwise comparison of the masterpieces of A and B are performed (equivalent to single value comparison of a multiple value comparison method). The relationship between each of the single value comparison results and the final multiple value result may be any one of following: if k masterpieces (k is less than or equal to m) are completely identical, 1 is returned if it is considered that the attributes of the masterpieces of A and B are identical, and otherwise 0 is returned; only if all masterpieces are identical, is it considered that the attributes are identical; if both k/m and k/n are greater than a preset threshold, it is considered that the attributes are identical; k/m or k/n is directly used as a return value.

Specifically, a single value comparison of attributes may be achieved by a single value comparer strcmp. Multiple value comparison of attributes may be achieved by a multiple value comparer multicmp, for example, supporting following comparison methods: overlap, jaccard, and exact.

An attribute importance degree is pre-configured by a user based on prior knowledge, and means an importance degree of an attribute comparison result on whether entities are identical. The attribute importance degree may include: comparison information (i.e., whether it is an attribute that must be compared), entity confidence level punishment information, and entity confidence level reward information.

S330: obtaining the entity similarity probability between the to-be-incorporated structured entity and the candidate entity by iterative calculation of similarity probabilities of attributes using a preset Bayesian model.

In the embodiment, the entity similarity probability between the to-be-incorporated structured entity and the candidate entity may be calculated using a Bayesian inference model. The principle of Bayesian inference is to calculate the entity similarity probability value based on a prior probability of comparison of each attribute. A Bayesian inference equation is as follows:

$$prob_{next} = \frac{prob_{cur} \times prob_{prop}}{(prob_{cur} \times prob_{prop}) + (1.0 - prob_{cur}) \times (1.0 - prob_{prop})}$$

Where, $prob_{next}$ is a Bayesian probability of this iteration, $prob_{cur}$ is a Bayesian probability of last iteration, and $prob_{prop}$ is a similarity probability of an attribute obtained in S320.

The physical significance of the Bayesian inference equation is:

$$P(E \text{ identical} | a \text{ identical}) = \frac{P(a \text{ identical} | E \text{ identical})P(E \text{ identical})}{P(a \text{ identical} | E \text{ identical})P(E \text{ identical}) + P(a \text{ identical} | E \text{ different})P(E \text{ different})}$$

Where, E denotes an entity, and a denotes an attribute.

In the embodiment, when calculating the entity similarity probability between the to-be-incorporated structured entity and the candidate entity using the Bayesian inference equation, the number of iterations is equal to the number of similarity probabilities of the attributes, the similarity probability of each attribute corresponds to one iteration, and an iterative order corresponding to the similarity probability of each attribute is not limited. That is, in the Bayesian iteration, it is only necessary to traverse the similarity probabilities of the attributes without considering the order of the similarity probability of the attribute in the iteration. In a first iteration, the value of $prob_{cur}$ may be set as 0.5 (denoting that during the initial iteration, the probabilities of identical attributes and different attributes corresponding to two entities are respectively 0.5). Then, in each iteration, the value of $prob_{cur}$ corresponds to the value of $prob_{next}$ in the last iteration.

S340: determining the to-be-incorporated structured entity being the associated entity if one or more entity similarity probabilities are greater than a preset threshold.

S350: merging the associated entity and the candidate entity, and incorporating the associated entity into the knowledge graph.

The method for incorporating a structured entity according to the embodiment calculates the similarity probability of each attribute between a to-be-incorporated structured entity and a candidate entity using a preset attribute comparison method and an attribute importance degree on the basis of the solutions of the above embodiments, effectively integrates prior knowledge and a machine learning model using a preset Bayesian model, and performs iterative calculation of the similarity probabilities of attributes, which can improve the efficiency and accuracy in calculating the entity similarity probability between entities, to enable the process of incorporating a structured entity into a knowledge graph be more efficient and accurate. Furthermore, the Bayesian solution is convenient, fast, and efficient for parameter adjustment, and is suitable for a scenario where it is necessary to fast obtain a result.

On the basis of the above embodiments, furthermore, the calculating a similarity probability of each attribute between the to-be-incorporated structured entity and the candidate entity using a preset attribute comparison method and an attribute importance degree may include the following steps.

Determining a to-be-compared attribute pair of the to-be-incorporated structured entity and the candidate entity based on comparison information in the attribute importance degree.

Selecting, for each to-be-compared attribute pair, a corresponding comparison method from preset attribute comparison methods to compare the attribute pair based on a characteristic of the to-be-compared attribute pair, to obtain a comparison result of the to-be-compared attribute pair.

Obtaining a similarity probability of the attribute by probability regression of the comparison result of the to-be-compared attribute pair using entity confidence level punishment information and entity confidence level reward information in the attribute importance degree.

In order to achieve comparison between attributes of two entities, a to-be-compared attribute pair between two entities may be determined. In the actual process of comparing two entities, there is often a situation where a missing attribute exists because it is impossible to match respective attributes corresponding to the two entities. As a result, whether there is an attribute that must be compared in the missing attribute may be first determined, and if there is the attribute that must be compared, then the two entities may be determined to be different from each other, that is, the entity similarity probability between the two entities is 0. In this case, it is neither necessary to compare other attributes any more, nor necessary to calculate the similarity between the entities. If there is no attribute that must be compared in the missing attribute, then the missing attribute may be determined to have no influence on the final entity association result, the missing attribute may be neglected, and only other attributes that can be matched are considered. For other attributes that can be matched, a to-be-compared attribute pair may also be finally determined by determining whether the attributes must be compared.

For example, the attributes of the entity of the actor A are gender, birthday, and body height respectively, while the attributes of the entity of the actor B are gender, birthday, and masterpiece respectively. In this case, the attributes of the entity of the actor A fail to match the attributes of the entity of the actor B. For the entity of the actor A, the masterpiece is a missing attribute, while for the entity of the actor B, the body height is a missing attribute. For the entity of the actor A and the entity of the actor B, if at least one of the masterpiece or the body height is an attribute that must be compared, then the entity of the actor A is determined to be different from the entity of the actor B. If neither of the masterpiece and the body height is an attribute that must be compared, then the attributes of masterpiece and body height may be neglected, and only the attributes of gender and birthday are considered. If gender is an attribute that must be compared, while birthday is not an attribute that must be compared, then the to-be-compared attribute pair is determined to be a gender attribute pair.

In the embodiment, a to-be-compared attribute pair of the to-be-incorporated structured entity and the candidate entity may be determined using comparison information included in the attribute importance degree. The comparison information may determine whether each attribute is an attribute that must be compared. The comparison information may preconfigure attributes using mustcmp, when the mustcmp value is configured as 1, then the corresponding attribute is determined to be an attribute that must be compared, and when the mustcmp value is configured as 0, then the corresponding attribute is determined not to be an attribute that must be compared.

In the embodiment, the attribute importance degree may further include: entity confidence level punishment information, and entity confidence level reward information. The entity confidence level punishment information may configure the attribute pair comparison result using min, and represents punishment of the confidence level of two entities being one entity when the attribute pair comparison result is inconsistent. The less is the min value, the less are the two entities likely to be one entity when the attribute pair is inconsistent. The value range is 0-0.5. The entity confidence level reward information may configure the attribute comparison result using max, and represents reward of the confidence level of two entities being one entity when the attribute pair comparison result is consistent. The larger is the max value, the more are the two entities likely to be one entity when the attribute pair is consistent. The value range is 0.5-1.

In the embodiment, a similarity probability of an attribute is obtained by probability regression of the comparison result of a to-be-compared attribute pair using entity confidence level punishment information min and entity confidence level reward information max in the attribute importance degree. Suppose the similarity probability of an attribute is P, and the comparison result of the to-be-compared attribute pair is S, then the probability regression equation is as follows:

$$P = S \times (\max - \min) + \min$$

On the basis of the above embodiments, furthermore, after obtaining the comparison result of the to-be-compared attribute pair, the method may further include the following steps.

Determining the to-be-incorporated structured entity being different from the candidate entity, if the entity confidence level punishment information in the attribute importance degree corresponding to the to-be-compared attribute pair is configured as a first value.

Obtaining a similarity probability of an attribute by probability regression of the comparison result of the to-be-compared attribute pair using the entity confidence level punishment information and the entity confidence level reward information, if the entity confidence level punishment information in the attribute importance degree corresponding to the to-be-compared attribute pair is not configured as the first value.

In the embodiment, the first value may be 0. When the value of the entity confidence level punishment information min is configured as 0, it may be determined that the to-be-incorporated structured entity must be inconsistent with the candidate entity, and in this case, it is no longer necessary to compare other attributes. When the value of the entity confidence level punishment information min is configured as other numeral value, it may be determined that even if the attributes are inconsistent, the entities may also be identical, and in this case, it is still necessary to continue subsequent operations to determine whether the entities are consistent.

Fourth embodiment is as follows.

Figure 4:
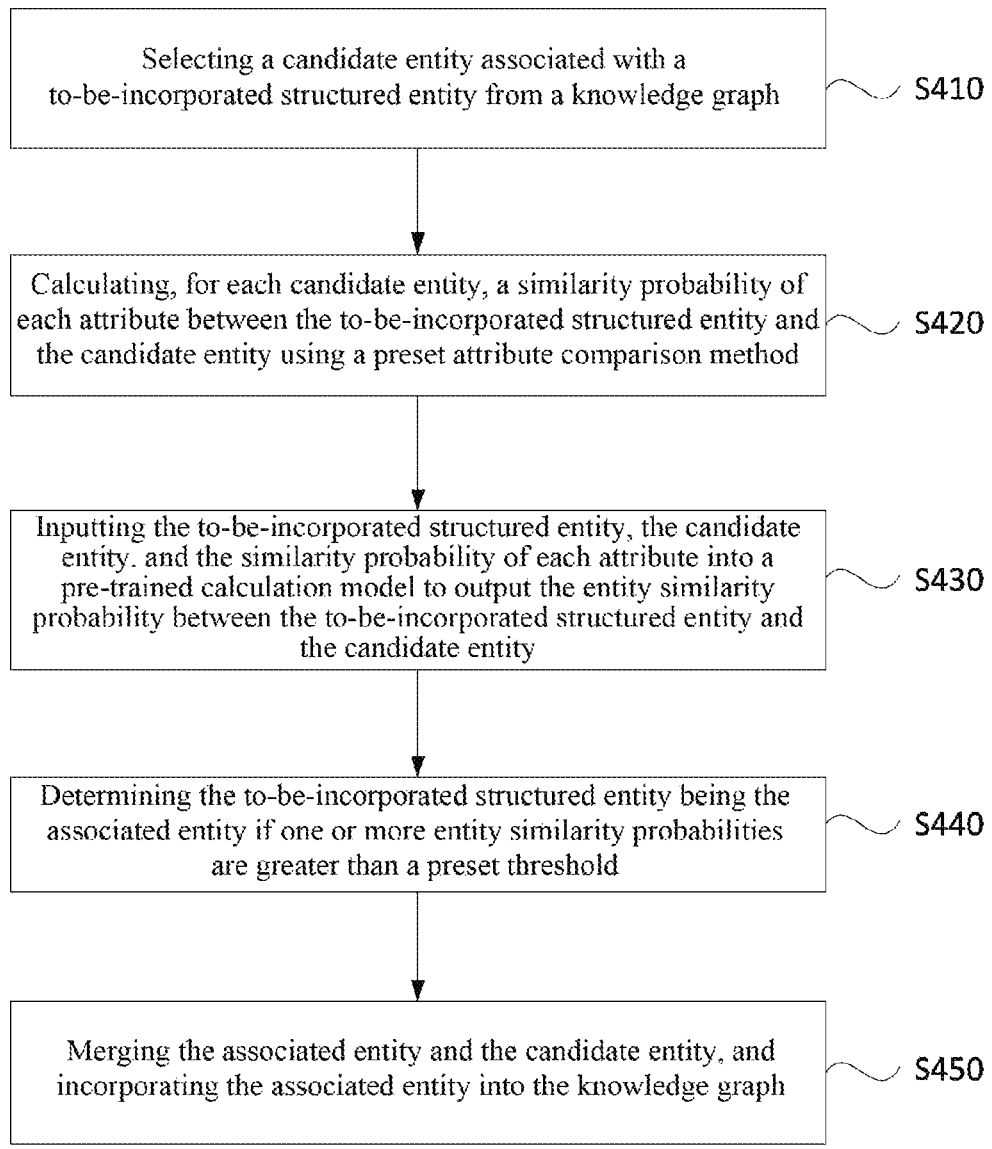
FIG. 4 is a flowchart of a method for incorporating a structured entity according to a fourth embodiment of the disclosure.

The embodiment provides another operational embodiment of S220 on the basis of the above embodiments. FIG. 4 is a flowchart of a method for incorporating a structured entity according to the fourth embodiment of the disclosure. As shown in FIG. 4, the method includes the following steps.

S410: selecting a candidate entity associated with a to-be-incorporated structured entity from a knowledge graph.

S420: calculating, for each candidate entity, a similarity probability of each attribute between the to-be-incorporated structured entity and the candidate entity using a preset attribute comparison method.

The preset attribute comparison method in the embodiment is identical to the preset attribute comparison method in S320, and a similarity of each attribute between the to-be-incorporated structured entity and the candidate entity calculated using the preset attribute comparison method is a comparison result of a comparer.

S430: inputting the to-be-incorporated structured entity, the candidate entity, and the similarity probability of each attribute into a pre-trained calculation model to output the entity similarity probability between the to-be-incorporated structured entity and the candidate entity.

In the embodiment, a model for calculating the entity similarity probability may be pre-trained, and the entity similarity probability between the to-be-incorporated structured entity and the candidate entity may be obtained by using the to-be-incorporated structured entity, the candidate entity, and the similarity probability of each attribute as an input of the model.

S440: determining the to-be-incorporated structured entity being the associated entity if one or more entity similarity probabilities are greater than a preset threshold.

S450: merging the associated entity and the candidate entity, and incorporating the associated entity into the knowledge graph.

The method for incorporating a structured entity according to the embodiment calculates the similarity probability of each attribute between the to-be-incorporated structured entity and the each candidate entity using the preset attribute comparison method based on the solutions of the above embodiments, and inputs the to-be-incorporated structured entity, the candidate entity, and the similarity probability of each attribute into a pre-trained calculation model to output the entity similarity probability between the to-be-incorporated structured entity and the candidate entity. The embodiment integrates prior knowledge of human and machine learning, thereby improving the accuracy of the knowledge graph while realizing simply and efficiently incorporating a structured entity.

On the basis of the above embodiments, furthermore, before the inputting the to-be-incorporated structured entity, the candidate entity, and the similarity probability of each attribute into the pre-trained calculation model, the calculation model shall be trained. Specifically, the training the calculation model include the following steps.

Forming an entity pair by every two entities, for all entities in the same category of the knowledge graph.

Comparing an attribute of the entity pair based on a preset to-be-compared attribute and a corresponding comparison method.

Grouping the entity pair into a corresponding group based on a comparison result, where each attribute includes: a group of identical attributes, a group of different attributes, and a group of missing attributes.

Extracting a preset number of entity pairs from each group of each attribute.

Obtaining training data based on user's annotations on the extracted entity pairs, where the training data include: the extracted entity pairs, whether the entity pairs are identical, and a comparison result of the attributes of the entity pairs.

Training a preset model using the training data to obtain the calculation model.

In the embodiment, before the inputting the to-be-incorporated structured entity, the candidate entity, and the similarity probability of each attribute into the pre-trained calculation model, the model for calculating the entity similarity probability may be pre-trained. The model for calculating the entity similarity probability may be pre-trained using a GBRank solution, and the trained model may be a logistic regression model, a support vector machine model, a maximum entropy model, or an XGBoost model.

In the embodiment, an entity pair is formed by every two entities, for all entities in a given category of the knowledge graph. For each entity pair, a comparison result is obtained by comparing each attribute pair of an entity pair based on user-configured to-be-compared attribute pair and a comparison method corresponding to a characteristic of the attribute pair. The comparison result of the attribute pair may be any one of identical attributes, different attributes, and missing attributes, that is, each attribute may correspond to three groups, which are identical attributes, different attributes, and missing attributes respectively. Based on different comparison results of attribute pairs, the entity pairs may be divided into different groups, and the number of groups of each entity pair is equal to the number of corresponding to-be-compared attribute pairs, that is, if there are x number of to-be-compared attribute pairs, the corresponding entity pairs correspond to x number of groups.

For example, the attributes of the entity of the actor A are gender, birthday, and body height respectively, while the attributes of the entity of the actor B are gender, birthday, and masterpiece respectively. The entity of the actor A and the entity of the actor B have identical gender, but different birthdays. The masterpiece attribute of the entity of the actor A is missing, while the body height attribute of the entity of the actor B is missing. If the user-configured to-be-compared attributes are gender, birthday, and masterpiece, then based on the comparison result, for the gender attribute, the entity of the actor A and the entity of the actor B may be grouped into a group of identical gender attributes; for the birthday attribute, the entity of the actor A and the entity of the actor B may be grouped into a group of different birthday attributes; and for the masterpiece attribute, the entity of the actor A and the entity of the actor B may be grouped into a group of missing masterpiece attributes.

In the embodiment, after completing grouping each entity pair, a preset number of entity pairs may be extracted from each group of each attribute, and sampling results may be merged using a merge algorithm. Specifically, the extracted identical entity pairs corresponding to different attribute comparison results are merged into one entity pair that carries the comparison result of each attribute. After merging the sampling results, a user may annotate the merged entity pairs based on his own prior knowledge, i.e., annotating whether the entity pair is identical, to obtain the final training data. The training data include: the extracted entity pairs, whether the entity pairs are identical, and a comparison result of the attributes of the entity pairs. The model for calculating the entity similarity probability is trained using the finally obtained training data to obtain model parameters, to enable the model to calculate the similarity probability of the entity pair based on the entity pair and the similarity probability of each attribute of the entity pair.

The embodiment uses a tree model for learning and training based on the GBRank solution, thereby avoiding user-configured min and max parameters, and improving the output efficiency of the configuration. At the same time, the solution proposes layered training for structured data, thereby effectively reducing the time of manual intervention, and improving the efficiency of configuration iteration. Furthermore, because the solution can automatically acquire the globally optimal solution, the entity similarity probability calculated using the model trained using the solution is highly reliable. The solution is suitable for a scenario where there are high requirements for the accuracy and recall rate.

Fifth embodiment is as follows.

Figure 5:
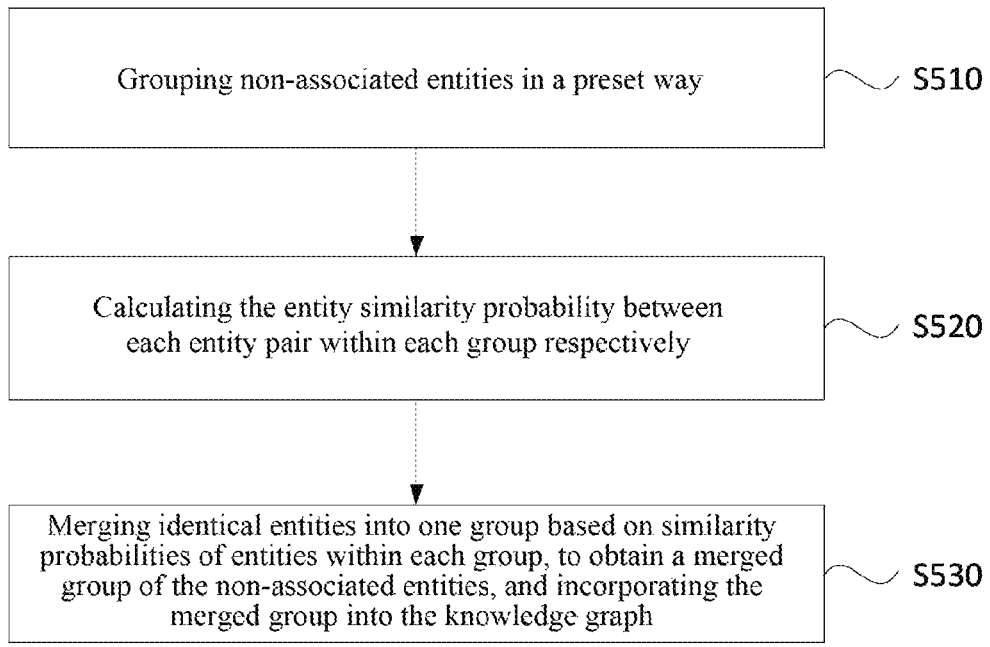
FIG. 5 is a flowchart of a method for normalizing a structured entity according to a fifth embodiment of the disclosure.

The embodiment provides an operational embodiment when the to-be-incorporated structured entity is a non-associated entity on the basis of the above embodiments. FIG. 5 is a flowchart of a method for normalizing a structured entity according to the fifth embodiment of the disclosure. As shown in FIG. 5, the method includes the following steps.

S510: grouping non-associated entities in a preset way.

In the embodiment, the to-be-incorporated structured entity may be determined to be a non-associated entity, if the similarity probabilities between the to-be-incorporated structured entity and all candidate entities are less than a preset threshold or no candidate entity associated with the to-be-incorporated structured entity is selected from the knowledge graph. When there is a non-associated entity, the non-associated entity may be incorporated into the knowledge graph in a normalized way. In the process of normalizing the non-associated entity, the non-associated entity may be grouped in a preset way.

The grouping the non-associated entity in a preset way may include the following steps.

Segmenting words in a name of the non-associated entity using a preconfigured grouping field and a number of to-be-segmented words, to obtain segmented words corresponding to the name of the non-associated entity, where different segmented words correspond to different groups.

Grouping an entity including the segmented words into a corresponding group.

In the embodiment, a grouping field may be a basis for grouping a plurality of non-associated entities, and may be names (aliases) of the non-associated entities. Non-associated entities having identical or similar names (or aliases) may be grouped into the same group by such grouping. Furthermore, different grouping fields may also be set based on categories of the non-associated entities. For non-associated entities of a movie category, the entity names may be set as a grouping field. For example, the non-associated entities of a movie category are Infernal Affairs 1, Infernal Affairs 2, and Chinese Odyssey. Infernal Affairs 1 and Infernal Affairs 2 may be grouped into the same group, and Chinese Odyssey may be grouped into another group based on the entity name. For non-associated entities of a catering category, a city may be added to the entity name as a grouping field. For example, there are a plurality of Haidilao Hot Pot Restaurants, and it is impossible to distinguish between Haidilao in various places only by the name of Haidilao. Therefore, the grouping field of the entity name may be further limited using the place name to group the Haidilao Hot Pot Restaurants in the same city into the same group, such as Shanghai Haidilao Hot Pot Restaurant, and Beijing Haidilao Hot Pot Restaurant.

In the embodiment, if the grouping field of the non-associated entity complies with a uniform format requirement, or non-associated entity pairs may be grouped directly based on the grouping field, then it is not necessary to segment words based on the grouping field, and otherwise it is necessary to segment words based on the grouping field. The number of to-be-segmented words is used for determining how to segment words based on the grouping field of non-associated entity, and may be determined based on the length of the grouping field. The longer is the length, the higher is the number of groups.

In the embodiment, when the grouping field is an entity name, word segmentation may be performed on the entity name using the number of to-be-segmented words, to obtain segmented words corresponding to the name of the non-associated entity, where different segmented words correspond to different groups. For example, the entity name is Huang Xiaoming, and the number of to-be-segmented words is 2, then the segmented words obtained by word segmentation are respectively Huang Xiao and Xiaoming, where Huang Xiao and Xiaoming correspond to different groups respectively. If the number of to-be-segmented words is 3, the segmented words obtained by word segmentation are Huang, Xiao, and Ming, where Huang, Xiao, and Ming correspond to different groups respectively.

In the embodiment, the entity including the segmented words may be grouped into a corresponding group. As an example, the names of non-associated entities include: Huang Xiaoming and Xiaoming, the number of to-be-segmented words is 3, then the segmented words after word segmentation of Huang Xiaoming are Huang, Xiao, and Ming, and the segmented words after word segmentation of Xiaoming are Xiao and Ming. After word segmentation, the segmented words may correspond to three groups, which are a group corresponding to Huang, a group corresponding to Xiao, and a group corresponding to Ming respectively. As a result, the entity including the segmented word Huang and having the entity name Huang Xiaoming may be grouped into a group corresponding to Huang, the two entities including the segmented word Xiao and having the entity names Huang Xiaoming and Xiaoming respectively may be grouped into the group corresponding to Xiao, and the two entities including the segmented word Ming and having the entity names Huang Xiaoming and Xiaoming respectively may be divided into the group corresponding to Ming.

S520: calculating the entity similarity probability between each entity pair within each group respectively.

In the embodiment, there may be a plurality of entities within each group, and any two entities may be used as one entity pair. The method for calculating the entity similarity probability between each entity pair within each group is identical to the method for calculating the entity similarity probability between the to-be-incorporated entity and the candidate entity in the above embodiments, and is not repeatedly described any more here.

S530: merging identical entities into one group based on similarity probabilities of entities within each group, to obtain a merged group of the non-associated entities, and incorporating the merged group into the knowledge graph.

In the embodiment, identical entities in different groups may be merged into one group using a merge algorithm based on the similarity probabilities of entities within each group, to obtain a merged group of the non-associated entities, and incorporate the merged group into the knowledge graph.

As an example, after calculation in S520, the entity A and the entity B in group 1 are identical, the entity B and the entity C in group 2 are identical, and the entity C and the entity D in group 2 are different. After merging using the merge algorithm, the entity A, the entity B, and the entity C may be merged into one merged group, and the entity D may be used as another merged group.

The method for incorporating a structured entity provided by the embodiment groups non-associated entities in a preset way, calculates the similarity probabilities of entities within each group respectively, merges identical entities into one group based on the similarity probabilities of entities within each group, to obtain a merged group of the non-associated entities, and incorporates the merged group into a knowledge graph, thereby solving the problem of failure to incorporate a structured entity caused by failure to associate the structured entity with the knowledge graph when incorporating the structured entity into the existing knowledge graph. Furthermore, by grouping non-associated entities, the method has reduced the number of entity pairs for normalization calculation, then reduces the amount of calculation, and guarantees the comprehensiveness and sufficiency of the calculation.

On the basis of the above embodiments, furthermore, before the calculating the entity similarity probability between each entity pair within each group, the method may further include: deduplicating entity pairs within all groups, to enable entity pairs to be different in different groups.

In the embodiment, entity pairs within all groups may be deduplicated, specifically, entities within each group may pairwise form entity pairs, and the entity pairs within all groups are compared to eliminate duplicate entity pairs, to enable entity pairs to be different in different groups.

Sixth embodiment is as follows.

Figure 6:
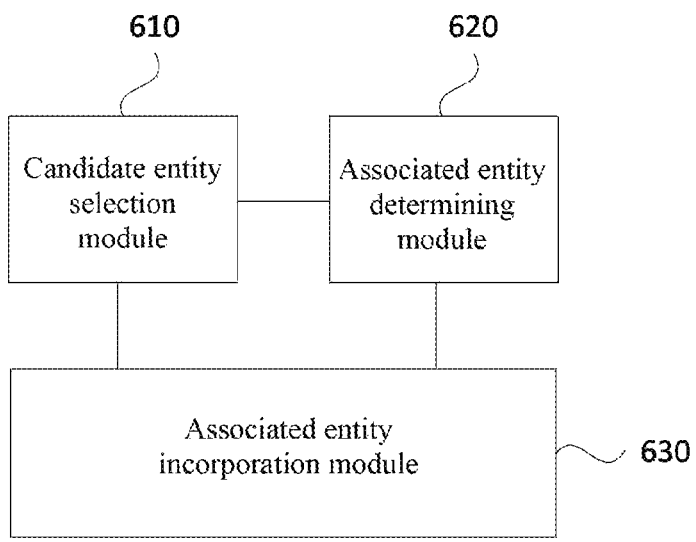
FIG. 6 is a structural schematic diagram of an apparatus for incorporating a structured entity according to a sixth embodiment of the disclosure.

FIG. 6 is a structural schematic diagram of an apparatus for incorporating a structured entity according to the sixth embodiment of the disclosure. As shown in FIG. 6, the apparatus for incorporating a structured entity includes the following.

A candidate entity selection module 610, for selecting a candidate entity associated with a to-be-incorporated structured entity from a knowledge graph.

An associated entity determining module 620, for determining the to-be-incorporated structured entity being an associated entity based on prior attribute information of a category of the candidate entity and a preset model.

An associated entity incorporation module 630, for merging the associated entity and the candidate entity, and incorporating the associated entity into the knowledge graph.

The apparatus for incorporating a structured entity according to the embodiment selects a candidate entity associated with a to-be-incorporated structured entity from a knowledge graph, determines the to-be-incorporated structured entity being an associated entity based on prior attribute information of a category of the candidate entity and a preset model, merges the associated entity and the candidate entity after determining the structured entity being an associated entity, and incorporates the associated entity into the knowledge graph, thereby solving the problems of large amount of calculation, and time-consuming and less accurate entity resolution when incorporating an entity into the existing knowledge graph, because it is necessary to perform entity resolution on the existing entities in the knowledge graph once when an entity is to be added each time. The apparatus selects a candidate entity, and then integrates a preset model using prior knowledge, which can effectively improve the efficiency and accuracy in associating entities, and reduce the amount of calculation, to enable the structured entity to be simply and efficiently incorporated into the knowledge graph.

Furthermore, the candidate entity selection module 610 specifically may be used for: selecting the candidate entity associated with a name of the to-be-incorporated structured entity from the knowledge graph using at least one of fuzzy query or accurate query based on a pre-established index.

The index is established based on identifiers, names and aliases of all structured entities in the knowledge graph, the fuzzy query is used for selecting a first preset number of candidate entities having names similar to the name of the to-be-incorporated structured entity based on the index, and the accurate query is used for selecting a second preset number of candidate entities having names identical to the name of the to-be-incorporated structured entity based on the index.

Furthermore, the associated entity determining module 620 specifically may include the following.

An entity similarity probability calculating submodule, for calculating an entity similarity probability between the to-be-incorporated structured entity and each candidate entity respectively based on the prior attribute information of the category of the candidate entity and the preset model.

An associated entity determining submodule, for determining the to-be-incorporated structured entity being the associated entity if one or more entity similarity probabilities are greater than a preset threshold.

A non-associated entity determining submodule, for determining the to-be-incorporated structured entity being a non-associated entity if all entity similarity probabilities are less than the preset threshold.

Furthermore, the entity similarity probability calculating submodule may specifically include the following.

An attribute similarity probability calculating unit, for calculating, for the each candidate entity, a similarity probability of each attribute between the to-be-incorporated structured entity and the candidate entity using a preset attribute comparison method and an attribute importance degree.

An entity similarity probability calculating unit, for obtaining the entity similarity probability between the to-be-incorporated structured entity and the candidate entity by iterative calculation of the similarity probability of each attribute using a preset Bayesian model.

Furthermore, the attribute similarity probability calculating unit may specifically include the following.

A to-be-compared attribute pair determining unit, for determining a to-be-compared attribute pair of the to-be-incorporated structured entity and the candidate entity based on comparison information in the attribute importance degree.

An attribute pair comparison result calculating subunit, for selecting, for each to-be-compared attribute pair, a corresponding comparison method from the attribute comparison method to compare the attribute pair based on a characteristic of the to-be-compared attribute pair, to obtain a comparison result of the to-be-compared attribute pair.

An attribute similarity calculation subunit, for obtaining a similarity probability of each attribute by probability regression of the comparison result of the each to-be-compared attribute pair using entity confidence level punishment information and entity confidence level reward information in the attribute importance degree.

Furthermore, the attribute similarity calculation subunit specifically may be used for: determining the to-be-incorporated structured entity being different from the each candidate entity, if the entity confidence level punishment information in the attribute importance degree corresponding to the to-be-compared attribute pair is configured as a first value; and obtaining a similarity probability of the attribute by probability regression of the comparison result of the to-be-compared attribute pair using the entity confidence level punishment information and the entity confidence level reward information, if the entity confidence level punishment information in the attribute importance degree corresponding to the to-be-compared attribute pair is not configured as the first value.

Furthermore, corresponding to the method using a pre-trained calculation model, the attribute similarity probability calculating unit may specifically be further used for calculating, for the each candidate entity, a similarity probability of each attribute between the to-be-incorporated structured entity and the candidate entity using a preset attribute comparison method; and the entity similarity probability calculating unit may specifically be further used for inputting the to-be-incorporated structured entity, the candidate entity, and the similarity probability of each attribute into a pre-trained calculation model to output the entity similarity probability between the to-be-incorporated structured entity and the candidate entity.

Furthermore, the apparatus may further include: a model training module, for: forming an entity pair by every two entities for all entities in a same category of the knowledge graph, before the inputting the to-be-incorporated structured entity, the candidate entity, and the similarity probability of each attribute into the pre-trained calculation model; comparing an attribute of the entity pair based on a preset to-be-compared attribute and a corresponding comparison method; grouping the entity pair into a corresponding group based on a comparison result, where each attribute includes: a group of identical attributes, a group of different attributes, and a group of missing attributes; extracting a preset number of entity pairs from each group of each attribute; obtaining training data based on user's annotations on the extracted entity pairs, where the training data include: the extracted entity pairs, whether the entity pairs are identical, and a comparison result of the attributes of the entity pairs; and training a preset model using the training data to obtain the calculation model.

Furthermore, the candidate entity selection module 610 may specifically be further used for: determining the to-be-incorporated structured entity being a non-associated entity, if no candidate entity associated with the to-be-incorporated structured entity is selected from the knowledge graph.

Furthermore, the apparatus may further include the following.

A grouping module, for grouping, after determining the to-be-incorporated structured entity being the non-associated entity, non-associated entities in a preset way.

An entity similarity probability calculating module, for calculating the entity similarity probability between each entity pair within each group respectively.

A merging and grouping module, for merging identical entities into one group based on similarity probabilities of entities within each group, to obtain a merged group of the non-associated entities, and incorporating the merged group into the knowledge graph.

Furthermore, the grouping module is specifically used for: segmenting words in a name of the non-associated entity using a preconfigured grouping field and a number of to-be-segmented words, to obtain segmented words corresponding to the name of the non-associated entity, where different segmented words correspond to different groups; and grouping an entity including the segmented words into a corresponding group.

Furthermore, the grouping module may specifically be further used for: deduplicating, before the calculating the entity similarity probability between each entity pair within each group, entity pairs within all groups, to enable entity pairs to be different in different groups.

Furthermore, the apparatus may further include: a unified grammatical system establishing module, for pre-establishing a unified grammatical system, before the selecting a candidate entity associated with a to-be-incorporated structured entity from a knowledge graph, to enable the to-be-incorporated structured entity and attributes thereof, and the structured entities in the knowledge graph and attributes thereof to be subject to the unified grammatical system.

The apparatus for incorporating a structured entity according to the embodiment of the disclosure may execute the method for incorporating a structured entity according to any embodiment of the disclosure, and has corresponding function modules for executing the method and beneficial effects.

Seventh embodiment is as follows.

Figure 7:
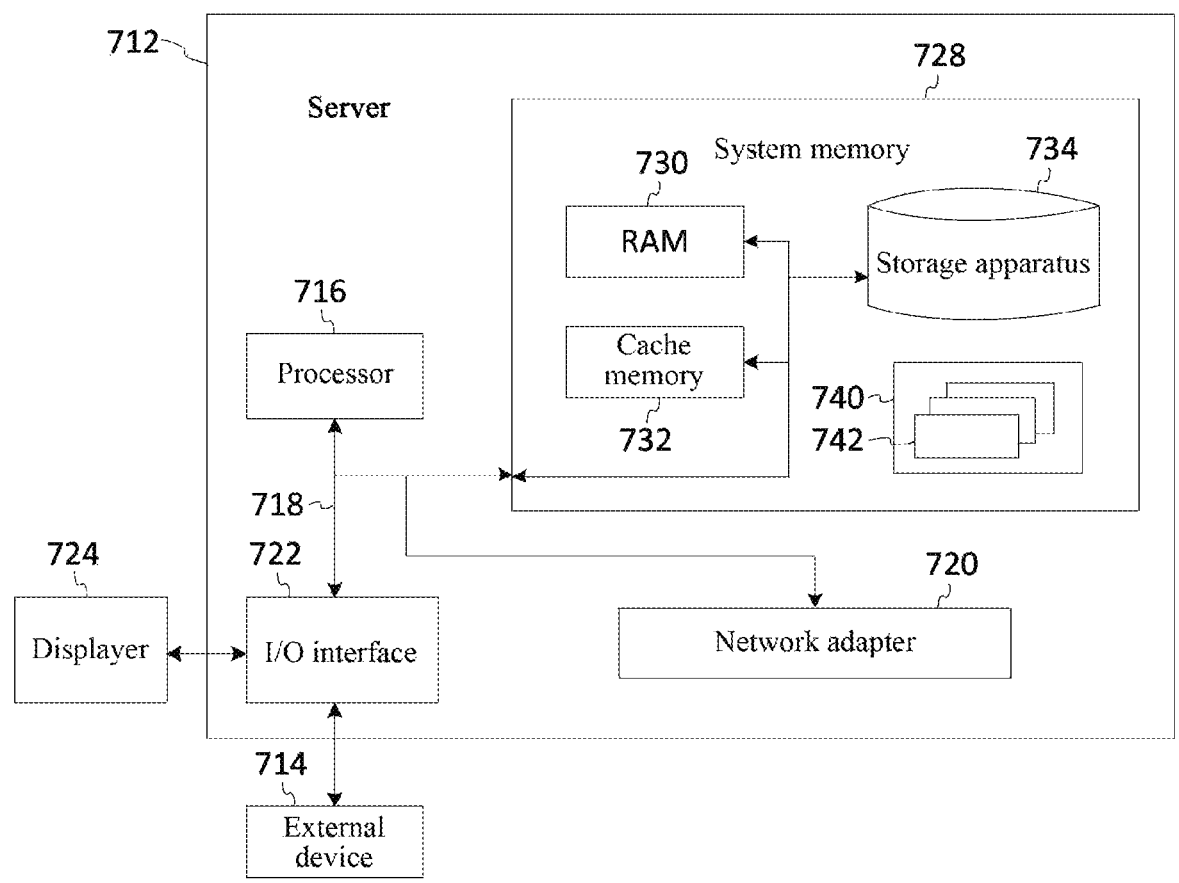
FIG. 7 is a structural schematic diagram of a server according to a seventh embodiment of the disclosure.

FIG. 7 is a structural schematic diagram of a server according to the seventh embodiment of the disclosure. FIG. 7 shows a block diagram of an illustrative server 712 that is suitable for implementing the embodiment of the disclosure. A server 712 shown in FIG. 7 is only an example, and should not limit the functions and scope of application of the embodiment of the disclosure in any way.

As shown in FIG. 7, the server 712 is expressed in the form of a general-purpose computing device. Components of the server 712 may include, but are not limited to: one or more processors 716, a system memory 728, and a bus 718 connecting different system components (including the system memory 728 and the processer 716).

The bus 718 represents one or more bus structures, including a memory bus or a memory controller, a peripheral bus, a graphics acceleration port, a processor, or a local bus of any one of the bus structures. For example, the system structures include, but are not limited to, an industrial standard architecture (ISA) bus, a micro channel architecture (MAC) bus, an enhanced ISA bus, a Video Electronics Standards Association (VESA) local bus, and a peripheral component interconnection (PCI) bus.

The server 712 typically includes multiple computer system readable media. These medias may be any available media that can be accessed by the server 712, including volatile media, non-volatile media, removable media and non-removable media.

The system memory 728 may include a computer system readable medium in the form of a volatile memory, such as a random access memory (RAM) 730 and/or a cache memory 732. The server 712 may further include other removable/non-removable, volatile/non-volatile computer system storage media. By way of example only, a storage apparatus 734 may be used for reading from and writing in non-removable and non-volatile magnetic media (not shown in FIG. 7, usually known as a "hard drive"). Although not shown in FIG. 7, a disk drive for reading from and writing in a removable non-volatile disk (such as a "floppy disk") and an optical driver for reading from and writing in a removable non-volatile disk (such as CD-ROM, DVD-ROM or other optical media) may be provided. With such arrangements, each driver may be connected to the bus 718 through one or more data media interfaces. The system memory 728 may include at least one program product, the program product has a set of (e.g., at least one) program module, and the program module is configured to execute the functions of the embodiments of the disclosure.

A program/utility tool 740 with a set of (at least one) program module 742 may be stored in, e.g., the system memory 728. The program module 742 includes, but is not limited to, an operating system, one or more applications, other program modules, and program data. Each of these examples or a combination thereof may include implementation of a network environment. The program module 742 usually executes the functions and/or methods according to the embodiments of the disclosure.

The server 712 may also communicate with one or more external devices 714 (e.g., a keyboard, a pointing device, and a displayer 724), and may also communicate with one or more devices that enable a user to interact with the server 712, and/or communicates with any other device (e.g., a network card and a modem) that enables the server 712 to communicate with one or more of other computing devices. This communication may be performed through an input/output (I/O) interface 722. Moreover, the server 712 may further communicate with one or more networks (e.g., a local area network (LAN), a wide area network (WAN) and/or a public network such as the Internet) through a network adapter 720. As shown in the FIG. 7, the network adapter 720 communicates with other modules of the server 712 through the bus 718. It should be appreciated that, although not shown in the figure, other hardware and/or software modules may be used in conjunction with the server 712, including but not limited to: a microcode, a device driver, a redundancy processing unit, an external disk drive array, a RAID system, a tape driver, and a data backup storage system.

The processor 716 executes various functional applications and data processing by running a program stored in the system memory 728, such as implementing the method for incorporating a structured entity according to the embodiment of the disclosure.

Eighth embodiment is as follows.

Eighth embodiment of the disclosure provides a computer readable storage medium storing a computer program therein, where the program, when executed by a processor, implements the method for incorporating a structured entity according to the embodiment of the disclosure, including: selecting a candidate entity associated with a to-be-incorporated structured entity from a knowledge graph; determining the to-be-incorporated structured entity being an associated entity based on prior attribute information of a category of the candidate entity and a preset model; and merging the associated entity and the candidate entity, and incorporating the associated entity into the knowledge graph.

Of course, a computer program stored on the computer readable storage medium according to the embodiment of the disclosure is not limited to executing the above method and operations, and may also execute relevant operations in the method for incorporating a structured entity according to any embodiment of the disclosure.

The computer storage medium according to the embodiments of the disclosure may use any combination of one or more computer readable medium. The computer readable medium may be a computer readable signal medium or a computer readable storage medium. The computer readable storage medium may be, for example but not limited to, an electric, magnetic, optical, electromagnetic, IR or semiconductor system, device or unit, or any combination thereof. More specific examples (non-exhaustive list) of the computer readable storage medium include: an electrical connection having one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any appropriate combination thereof. Herein, the computer readable storage medium may be any tangible medium containing or storing programs, which may be used by an instruction execution system, device or unit, or a combination thereof.

The computer readable signal medium may be a data signal included in the baseband or transmitted as a part of carrier wave, and carries computer readable program codes. The data signal may be transmitted in multiple forms, including but not limited to an electromagnetic signal, an optical signal or any appropriate combination thereof. The computer readable signal medium may also be any computer readable medium rather than a computer readable storage medium, and the computer readable medium may send, spread or transmit programs to be used by an instruction execution system, device or unit, or a combination thereof.

Program codes contained in the computer readable medium may be transmitted using any suitable medium, including but not limited to: wireless, wire, cable, RF, etc., or any appropriate combination thereof.

A computer program code for executing the operations according to some embodiments of the disclosure may be written in one or more programming languages or a combination thereof. The programming language includes an object-oriented programming language, such as Java, Smalltalk and C++, and further includes a general procedural programming language, such as "C" language or a similar programming language. The program codes may be executed entirely on a computer of a user, executed partially on a computer of a user, executed as a standalone package, executed partially on the computer of the user and partially on a remote computer, or executed entirely on the remote computer or a server. When the remote computer is involved, the remote computer may be connected to a user computer through any type of network, including a local area network (LAN) or a wide area network (WAN), or be connected to an external computer (e.g., connected through Internet provided by an Internet service provider).

It is to be noted that the foregoing embodiments are merely preferred embodiments of the present disclosure, and the technical principles used thereby. Persons skilled in the art may understand that the present disclosure is not limited to the specific embodiments described herein. Persons skilled in the art may make various obvious changes, readjustments and substitutions without departing from the protection scope of the present disclosure. Therefore, although reference is made to the present disclosure in more detail in the foregoing embodiments, the present disclosure is not merely limited to the foregoing embodiments, more additional equivalent embodiments may be further included without departing from the conception of the present disclosure. The scope of the present disclosure is determined by the scope of the appended claims.

What is claimed is:

1. A method for incorporating a structured entity, comprising:
    obtaining a to-be-incorporated structured entity by web crawling;
    selecting a candidate entity associated with a name of the to-be-incorporated structured entity from a knowledge graph using at least one of fuzzy query or accurate query based on a pre-established index, wherein the index is established based on identifiers, names and aliases of all structured entities in the knowledge graph, the fuzzy query is used for selecting a first preset number of candidate entities having names similar to the name of the to-be-incorporated structured entity based on the index, and the accurate query is used for selecting a second preset number of candidate entities having names identical to the name of the to-be-incorporated structured entity based on the index;
    calculating an entity similarity probability between the to-be-incorporated structured entity and each candidate entity respectively based on prior attribute information of a category of a candidate entity and a preset model by:
        calculating, for each candidate entity, a similarity probability of each attribute between the to-be-incorporated structured entity and the candidate entity using a preset attribute comparison method; and
        inputting the to-be-incorporated structured entity, the candidate entity, and the similarity probability of each attribute into a pre-trained calculation model to output the entity similarity probability between the to-be-incorporated structured entity and the candidate entity;
    determining the to-be-incorporated structured entity being an associated entity based on the entity similarity probability; and
    merging an associated entity with a highest entity similarity probability and the candidate entity, and incorporating the associated entity with the highest entity similarity probability into the knowledge graph.

2. The method according to claim 1, wherein the method further comprises:
    determining the to-be-incorporated structured entity as being the associated entity if one or more entity similarity probabilities are greater than a preset threshold; and
    determining the to-be-incorporated structured entity as being a non-associated entity if all entity similarity probabilities are less than the preset threshold.

3. The method according to claim 2, wherein after determining that the to-be-incorporated structured entity is the non-associated entity, the method further comprises:
    grouping non-associated entities in a preset way;
    calculating the entity similarity probability between each entity pair within each group respectively; and
    merging identical entities into one group based on similarity probabilities of entities within each group, to obtain a merged group of the non-associated entities, and incorporating the merged group into the knowledge graph.

4. The method according to claim 3, wherein grouping the non-associated entities in the preset way comprises:
    segmenting words in a name of the non-associated entity using a preconfigured grouping field and a number of to-be-segmented words, to obtain segmented words corresponding to the name of the non-associated entity, wherein different segmented words correspond to different groups; and
    grouping an entity including the segmented words into a corresponding group.

5. The method according to claim 3, wherein before calculating the entity similarity probability between each entity pair within each group respectively, the method further comprises:
    deduplicating entity pairs within all groups, to enable entity pairs to be different in different groups.

6. The method according to claim 1, wherein calculating the entity similarity probability between the to-be-incorporated structured entity and each candidate entity respectively based on prior attribute information of the category of the candidate entity and the preset model comprises:
    calculating, for each candidate entity, the similarity probability of each attribute between the to-be-incorporated structured entity and the candidate entity using the preset attribute comparison method and an attribute importance degree; and
    wherein the pre-trained calculation model comprises a preset Bayesian model.

7. The method according to claim 6, wherein calculating the similarity probability of each attribute between the to-be-incorporated structured entity and the candidate entity using the preset attribute comparison method and the attribute importance degree comprises:
    determining a to-be-compared attribute pair of the to-be-incorporated structured entity and the candidate entity based on comparison information in the attribute importance degree;
    selecting, for each to-be-compared attribute pair, a corresponding comparison method from the preset attribute comparison method to compare the attribute pair based on a characteristic of the to-be-compared attribute pair, to obtain a comparison result of the to-be-compared attribute pair; and
    obtaining a similarity probability of each attribute by probability regression of the comparison result of the each to-be-compared attribute pair using entity confidence level punishment information and entity confidence level reward information in the attribute importance degree.

8. The method according to claim 7, wherein after obtaining the comparison result of the to-be-compared attribute pair, the method further comprises:
    determining the to-be-incorporated structured entity being different from the candidate entity, if the entity confidence level punishment information in the attribute importance degree corresponding to the to-be-compared attribute pair is configured as a first value; and
    obtaining a similarity probability of the attribute by probability regression of the comparison result of the to-be-compared attribute pair using the entity confidence level punishment information and the entity confidence level reward information, if the entity confidence level punishment information in the attribute importance degree corresponding to the to-be-compared attribute pair is not configured as the first value.

9. The method according to claim 1, wherein before inputting the to-be-incorporated structured entity, the candidate entity, and the similarity probability of each attribute into the pre-trained calculation model, the method further comprises:
   forming an entity pair by every two entities, for all entities in a same category of the knowledge graph;
   comparing an attribute of the entity pair based on a preset to-be-compared attribute and a corresponding comparison method;
   grouping the entity pair into a corresponding group based on a comparison result, wherein each attribute comprises: a group of identical attributes, a group of different attributes, and a group of missing attributes;
   extracting a preset number of entity pairs from each group of each attribute;
   obtaining training data based on user's annotations on the extracted entity pairs, wherein the training data comprises: the extracted entity pairs, whether the entity pairs are identical, and a comparison result of the attributes of the entity pairs; and
   training a preset model using the training data to obtain the calculation model.

10. The method according to claim 1, wherein selecting the candidate entity associated with the name of the to-be-incorporated structured entity from the knowledge graph comprises:
    determining the to-be-incorporated structured entity as being a non-associated entity, if no candidate entity associated with the to-be-incorporated structured entity is selected from the knowledge graph.

11. The method according to claim 1, wherein before selecting the candidate entity associated with the to-be-incorporated structured entity from the knowledge graph, the method comprises:
    pre-establishing a unified grammatical system, to enable the to-be-incorporated structured entity and attributes thereof, and the structured entities in the knowledge graph and attributes thereof to be subject to the unified grammatical system.

12. An apparatus for incorporating a structured entity, comprising:
    at least one processor; and
    a memory storing instructions, the instructions, when executed by the at least one processor, cause the at least one processor to perform operations, the operations comprising:
    obtaining a to-be-incorporated structured entity by web crawling;
    selecting a candidate entity associated with a name of the to-be-incorporated structured entity from a knowledge graph using at least one of fuzzy query or accurate query based on a pre-established index, wherein the index is established based on identifiers, names and aliases of all structured entities in the knowledge graph, the fuzzy query is used for selecting a first preset number of candidate entities having names similar to the name of the to-be-incorporated structured entity based on the index, and the accurate query is used for selecting a second preset number of candidate entities having names identical to the name of the to-be-incorporated structured entity based on the index;
    calculating an entity similarity probability between the to-be-incorporated structured entity and each candidate entity respectively based on prior attribute information of a category of a candidate entity and a preset model by:
        calculating, for each candidate entity, a similarity probability of each attribute between the to-be-incorporated structured entity and the candidate entity using a preset attribute comparison method; and
        inputting the to-be-incorporated structured entity, the candidate entity, and the similarity probability of each attribute into a pre-trained calculation model to output the entity similarity probability between the to-be-incorporated structured entity and the candidate entity;
    determining the to-be-incorporated structured entity being an associated entity based on the entity similarity probability; and
    merging an associated entity with a highest entity similarity probability and the candidate entity, and incorporating the associated entity with the highest entity similarity probability into the knowledge graph.

13. The apparatus according to claim 12, wherein the operations further comprise:
    determining the to-be-incorporated structured entity as being the associated entity if one or more entity similarity probabilities are greater than a preset threshold; and
    determining the to-be-incorporated structured entity as being a non-associated entity if all entity similarity probabilities are less than the preset threshold.

14. The apparatus according to claim 12, wherein calculating the entity similarity probability between the to-be-incorporated structured entity and each candidate entity respectively based on prior attribute information of the category of the candidate entity and a preset model comprises:
    calculating, for each candidate entity, the similarity probability of each attribute between the to-be-incorporated structured entity and the candidate entity using the preset attribute comparison method and an attribute importance degree; and
    wherein the pre-trained calculation model comprises a preset Bayesian model.

15. The apparatus according to claim 14, wherein calculating the similarity probability of each attribute between the to-be-incorporated structured entity and the candidate entity using the preset attribute comparison method and the attribute importance degree comprises:
    determining a to-be-compared attribute pair of the to-be-incorporated structured entity and the candidate entity based on comparison information in the attribute importance degree;
    selecting, for each to-be-compared attribute pair, a corresponding comparison method from the preset attribute comparison method to compare the attribute pair based on a characteristic of the to-be-compared attribute pair, to obtain a comparison result of the to-be-compared attribute pair; and
    obtaining a similarity probability of each attribute by probability regression of the comparison result of the each to-be-compared attribute pair using entity confidence level punishment information and entity confidence level reward information in the attribute importance degree.

16. The apparatus according to claim 15, wherein after obtaining the comparison result of the to-be-compared attribute pair, the operations further comprise:

determining the to-be-incorporated structured entity being different from the candidate entity, if the entity confidence level punishment information in the attribute importance degree corresponding to the to-be-compared attribute pair is configured as a first value; and obtaining a similarity probability of the attribute by probability regression of the comparison result of the to-be-compared attribute pair using the entity confidence level punishment information and the entity confidence level reward information, if the entity confidence level punishment information in the attribute importance degree corresponding to the to-be-compared attribute pair is not configured as the first value.

17. A non-transitory computer storage medium storing a computer program, the computer program, when executed by one or more processors, causes the one or more processors to perform operations, the operations comprising:

obtaining a to-be-incorporated structured entity by web crawling;

selecting a candidate entity associated with a name of the to-be-incorporated structured entity from a knowledge graph using at least one of fuzzy query or accurate query based on a pre-established index, wherein the index is established based on identifiers, names and aliases of all structured entities in the knowledge graph, the fuzzy query is used for selecting a first preset number of candidate entities having names similar to the name of the to-be-incorporated structured entity based on the index, and the accurate query is used for selecting a second preset number of candidate entities having names identical to the name of the to-be-incorporated structured entity based on the index;

calculating an entity similarity probability between the to-be-incorporated structured entity and each candidate entity respectively based on prior attribute information of a category of a candidate entity and a preset model by:

calculating, for each candidate entity, a similarity probability of each attribute between the to-be-incorporated structured entity and the candidate entity using a preset attribute comparison method; and inputting the to-be-incorporated structured entity, the candidate entity, and the similarity probability of each attribute into a pre-trained calculation model to output the entity similarity probability between the to-be-incorporated structured entity and the candidate entity;

determining the to-be-incorporated structured entity being an associated entity based on the entity similarity probability; and merging an associated entity with a highest entity similarity probability and the candidate entity, and incorporating the associated entity with the highest entity similarity probability into the knowledge graph.

* * * * *